(Model.)
G. KNAUTH.
GUARD FOR CARVING FORKS.
No. 319,098. Patented June 2, 1885.
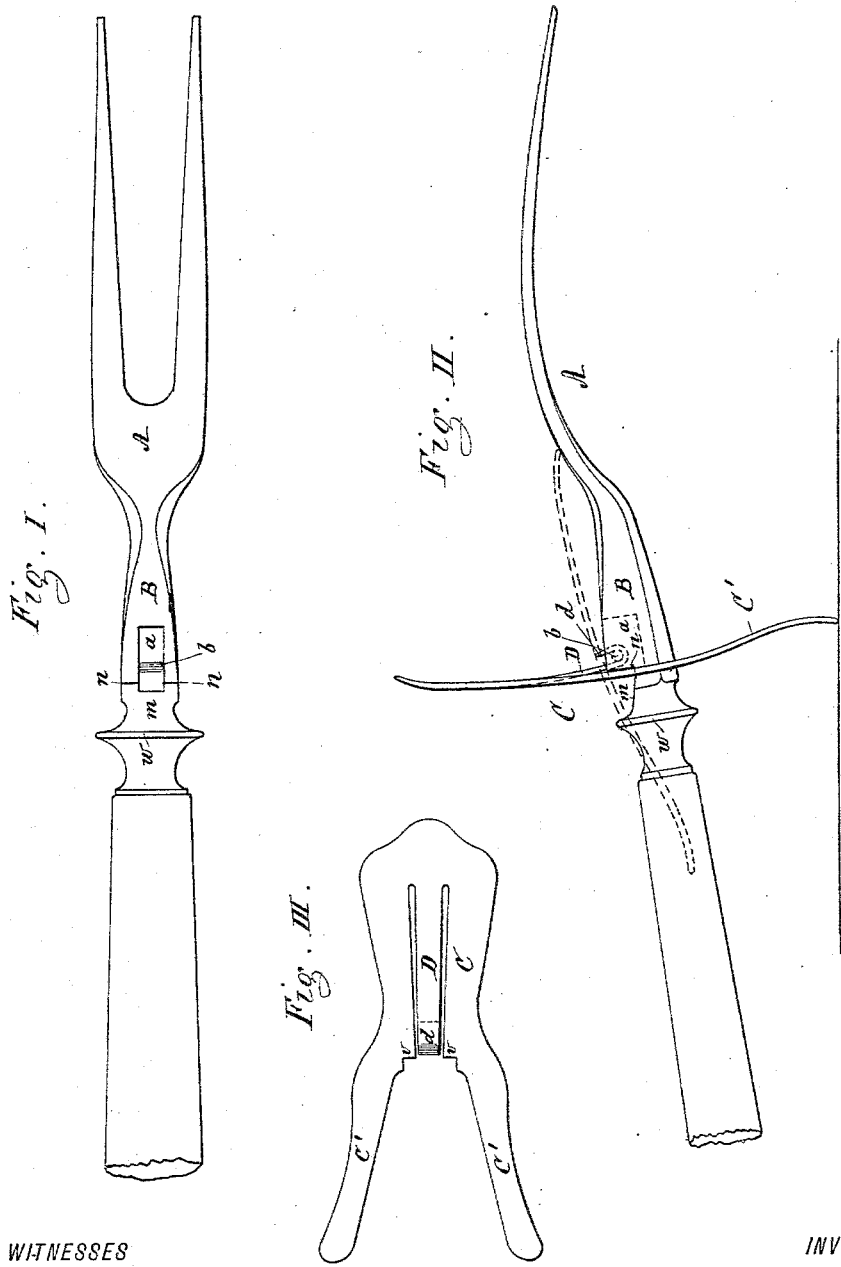
WITNESSES
Robt Roy.
M. E. McHugh
INVENTOR
Gustav Knauth
By Roeder & Briesen
Attorneys

UNITED STATES PATENT OFFICE.

GUSTAV KNAUTH, OF BROOKLYN, NEW YORK.

GUARD FOR CARVING-FORKS.

SPECIFICATION forming part of Letters Patent No. 319,098, dated June 2, 1885.

Application filed March 9, 1885. (Model.)

*To all whom it may concern:*

Be it known that I, GUSTAV KNAUTH, a citizen of the United States, residing at Brooklyn, in the State of New York, have invented a new and useful Improvement in Guards for Carving-Forks, of which the following is a specification.

The object of my invention is to provide a suitable guard-rest on a carving-fork which is readily removed for the purpose of cleaning.

The nature of my invention consists in the arrangement of a recess in the shank of the fork with a shoulder on one end and an inclined surface toward said shoulder, with a pivot-pin securely fastened in said recess. The guard-rest is formed with a central tongue, forming a part of the guard, the lower end of which is bent inwardly to form a loop to pass around the pivot-pin in the slot of the fork-shank.

In the accompanying drawings, Figure I represents a top view of the fork with the guard-rest removed. Fig. II is a side view with the guard-rest in position to support the fork. Fig. III is a front view of the guard-rest.

A is the carving-fork. In the shank B a recess, $a$, is made, in which a pivot-pin, $b$, is securely fastened. On the end of the recess a shoulder, $n$, is formed, from the bottom of which an inclined surface, $m$, is made toward the bead $w$ on the fork. The guard-rest C is made with two legs, C' C', and a central tongue, D. This central tongue forms a spring, the lower end, $d$, of which is bent inwardly, as shown in Fig. II, to form an open loop capable of passing around the pivot-pin $b$. The inclined surface $m$ facilitates the passing of the loop end $d$ into the slot or recess $a$, to engage with the pivot-pin $b$, upon which the guard-rest C turns, either to support the fork, as shown in Fig. II, or to be turned close to the fork, as shown in dotted lines, when not in use. When the guard-rest is in use, the inner projections, $v$, of the same abut against the shoulders $n$ at the ends of the recess $a$, and thus hold the guard in the desired position.

To clean the fork, or, if desired, for other purposes, the guard-rest may be entirely removed from the fork by disengaging the hook $d$ from the pivot-pin $b$.

What I claim as my invention is—

The combination of fork A, having shoulders $n$ $n$, pivot-pin $b$, and inclined surface $m$, with guard-rest C, having legs C' C', and central hooked tongue, D, the inclined surface $m$ allowing the easy removal of the guard, substantially as specified.

GUSTAV KNAUTH.

Witnesses:
HENRY E. ROEDER,
F. V. BRIESEN.